United States Patent
Pan et al.

(10) Patent No.: US 9,775,056 B2
(45) Date of Patent: Sep. 26, 2017

(54) METHOD AND DEVICE FOR PERFORMING INTERFERENCE CONTROL

(71) Applicant: China Academy of Telecommunications Technology, Beijing (CN)

(72) Inventors: Xueming Pan, Beijing (CN); Zukang Shen, Beijing (CN); Jing Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/397,198

(22) PCT Filed: Mar. 5, 2013

(86) PCT No.: PCT/CN2013/072172
§ 371 (c)(1),
(2) Date: Oct. 26, 2014

(87) PCT Pub. No.: WO2013/159598
PCT Pub. Date: Oct. 31, 2013

(65) Prior Publication Data
US 2015/0045076 A1 Feb. 12, 2015

(30) Foreign Application Priority Data
Apr. 26, 2012 (CN) .......................... 2012 1 0127618

(51) Int. Cl.
*H04W 24/02* (2009.01)
*H04W 28/02* (2009.01)
(Continued)

(52) U.S. Cl.
CPC .......... *H04W 24/02* (2013.01); *H04W 16/10* (2013.01); *H04W 28/0289* (2013.01); *H04W 72/0446* (2013.01); *H04W 72/082* (2013.01)

(58) Field of Classification Search
CPC .......... H04W 72/082; H04W 72/0446; H04W 72/0486; H04W 72/1236; H04W 52/0206;
(Continued)

(56) References Cited

U.S. PATENT DOCUMENTS 5,497,503 A * 3/1996 Rydberg .............. H04B 7/2621
455/454
2011/0149879 A1* 6/2011 Noriega et al. ................ 370/329

FOREIGN PATENT DOCUMENTS

CN 1564483 A 1/2005
CN 101291515 A 10/2008
(Continued)

OTHER PUBLICATIONS

The 3G4G Blog, eICIC, 2011 http://blog.3g4g.co.uk/2011/01/eicic-enhanced-inter-cell-interference.html.*
(Continued)

*Primary Examiner* — Ping Hsieh
*Assistant Examiner* — James Yang
(74) *Attorney, Agent, or Firm* — Kilpatrick Townsend & Stockton LLP

(57) ABSTRACT

A method and device for performing interference control are provided. The method includes: network side device determines traffic load parameter value of each cell and the measurement parameter between the base stations which random two cells belongs to; For the two cells, the network side device determines an interference control threshold according to the traffic load parameter value of the two cells, and compares the determined the measurement parameter with the interference control threshold, and performs cluster
(Continued)

partition according to the comparing result. The network side device performs interference control according to the partitioned cluster. Because the factor of cell traffic load is considered in performing TDD cross link interference control, thus the cross link interference in TDD networking is reduced.

16 Claims, 4 Drawing Sheets

(51) Int. Cl.
*H04W 72/08* (2009.01)
*H04W 16/10* (2009.01)
*H04W 72/04* (2009.01)

(58) Field of Classification Search
CPC ..... H04W 16/10; H04W 28/04; H04W 16/32; H04W 16/28; H04L 41/0833; H04B 7/026; H04B 7/024
See application file for complete search history.

(56) References Cited

FOREIGN PATENT DOCUMENTS

| | | |
|---|---|---|
| CN | 101459956 A | 6/2009 |
| CN | 102036295 A | 4/2011 |
| CN | 102291785 A | 12/2011 |
| EP | 2437536 A1 * | 4/2012 |
| EP | 2437536 A1 | 4/2012 |

OTHER PUBLICATIONS

International Search Report and Written Opinion for PCT/CN2013/072172 (Chinese and English version).

Intel Corporation: "Co-channel DL-UL interference analysis for single operator Macro-Pica deployment scenario", 3GPP Draft; R4-121905, 3rd Generation Partnership Project (3GPP), Mobile Competence Centre ; 650, Route Des Lucioles ; F-06921 Sophia-Antipolis Cedex ; France, val. Ran WG4, No. Jeju, Korea; 20120326-20120330, Mar. 19, 2012 (Mar. 19, 2012), XP050613199, [retrieved on Mar. 19, 2012].

"3rd Generation Partnership Project; Technical Specification Group Radio Access Network; Further Enhancements to LTE TDD for DL-UL Interference Management and Traffic Adaptation; (Release 11)". 3GPP Standard; 3GPP TR 36.828. $3^{rd}$ Generation Partnership Project (3GPP). Mobile Competence Centre ; 658. Route Des Lucioles ; F-86921 Sophia-Antipolis Cedex; France. val. RAN WG1. No. V2.8.8. Jun. 15, 2012 (2012-86-15). pp. 1-189. XP858588684. [retrieved on Jun. 15, 2012].

The Extended European Search Report issued on Sep. 30, 2015 in the EP counterpart application (13782052.8).

An Office Action issued on Jul. 1, 2015 in the CN counterpart application (201210127618.5).

* cited by examiner

METHOD AND DEVICE FOR PERFORMING INTERFERENCE CONTROL

This application is a US National Stage of International Application No. PCT/CN2013/072172, filed on Mar. 5, 2013, designating the United States and claiming the priority to Chinese patent application No. 201210127618.5, field to Chinese Patent Office on Apr. 26, 2012 and entitled "method and device for performing interference control", the content of which is incorporated by reference in its entirety herein.

FIELD

The invention relates to the technical field of wireless communications, in particular to a method and device for performing interference control.

BACKGROUND

As for basic duplex modes adopted by a cellular system, a TDD (Time division duplex) mode refers to the situation that an uplink and a downlink use a same working frequency band, uplink and downlink signals are transmitted at different time intervals and a Guard Period (GP) exists between the uplink and the downlink; and an FDD (Frequency division duplex) mode refers to the situation that the uplink and the downlink use different working frequency bands, uplink and downlink signals can be transmitted on different frequency carriers at the same time and a Guard Band (GB) exists between the uplink and the downlink.

A frame structure of an LTE (Long Term Evolution) TDD system is slightly complex. As shown in FIG. 1A, the length of a radio frame is 10 ms, the radio frame contains two types of subframes. i.e. special subframes and normal subframes, the number of which is 10 in total, and the length of each subframe is 1 ms. The special subframes are divided into three subframes: a DwPTS (Downlink Pilot Time Slot) used for transmitting a PSS (Primary Synchronization Signal), a PDCCH (Physical Downlink Control Channel), a PHICH (Physical HARQ Indication Channel), a PCFICH (Physical Control Format Indication Channel), a PDSCH (Physical Downlink Shared Channel) and the like; a GP used as the Guard Period between the downlink and the uplink; and an UpPTS (Uplink Pilot Time Slot) used for transmitting an SRS (Sounding Reference Signal), a PRACH (Physical Random Access Channel) and the like. The normal subframe includes uplink subframes and downlink subframes which are used for transmitting uplink/downlink control channels, traffic data and the like. One radio frame can be configured with two special subframes (positioned at the subframes 1 and 6), or can be configured with one special subframe (positioned at the subframe 1). The subframe 0 and the subframe 5, as well as the DwPTS in the special subframes, are always used for downlink transmission; the subframe 2 and the UpPTS in the special subframes are always used for uplink transmission; and other subframes can be configured for uplink transmission or downlink transmission as required.

In the TDD system, the uplink transmission and the downlink transmission use the same frequency resources and uplink/downlink signals are transmitted on the different subframes. The common TDD system including a 3G TD-SCDMA (Time Division Synchronous Code Division Multiple Access) system and a 4G TD-LTE system, the uplink and downlink subframes are partitioned statically or semi-statically and it is common to determine the proportional partition of the uplink and downlink subframes during a network planning according to the type of a cell and the approximate traffic proportion and keep the proportional partition unchanged. This is a relatively simple and effective scheme under the background of large coverage of macro cells. However, with the development of technologies, more and more Pico cells, Home NodeBs and other low-power base stations are deployed to provide local small coverage. There are a smaller number of User Equipments (UEs) and a significant change in UE's traffic requirements in these cells, thus the configuration of uplink sub-frames and downlink sub-frames is needed to be varied dynamically.

In an actual system, if different uplink and downlink subframe configurations are set for different cells, cross link interference of the adjacent cells can be caused. As shown in FIG. 1B, a femto cell is configured to receive the uplink signals on a time slot on which the macro cell transmits the downlink signals, then base station-base station interference occurs between the two cells and a femto base station directly receives the downlink signals from a Macro base station, so that the quality of L-UE (Local UE) uplink signals received by the femto base station is seriously affected.

The adjacent cells herein can be the geographically adjacent cells using a same TDD carrier (as shown in FIG. 1B), or the geographically overlapped cells or the cells using adjacent TDD carriers (as shown in FIG. 1C). Simultaneously, the adjacent cells herein can be the cells deployed at the same layer (such as the macro cells) or the cells deployed in layers (such as the macro cells, the Pico cells, the Home NodeBs and the like).

As reconfigurations of the uplink and the downlink of a TDD cell are relatively flexible, cross link interference strength is increased. However, there is no solution for reducing the cross link interference in TDD networking at present.

SUMMARY

An embodiment of the invention provides a method and device for performing interference control so as to reduce cross link interference in TDD networking.

An embodiment of the invention provides a method for performing interference control, which includes:

determining, by a network side device, a traffic load parameter value of each cell and a measurement parameter value between base stations which serve for any two cells;

For the two cells, determining, by the network side device, an interference control threshold value according to the traffic load parameter values of the two cells, comparing the measurement parameter value determined with the interference control threshold value and dividing the two cells into clusters according to the comparison result; and Performing, by the network side device, interference control according to clusters after dividing.

An embodiment of the invention provides a device for performing interference control, including:

A determination module configured to determine a traffic load parameter value of each cell and a measurement parameter value between base stations which serve for any two cells;

A division module configured to, for the two cells, determine an interference control threshold value according to the traffic load parameter values of the two cells, compare the measurement parameter value determined with the interference control threshold value and divide the two cells into clusters according to the comparison result; and A control module configured to perform interference control according to clusters after dividing.

An embodiment of the invention provides a system for performing interference control, including:

A network side device configured to determine a traffic load parameter value of each cell and a measurement parameter value between base stations which serve for any two cells; for the two cells, determine an interference control threshold value according to the traffic load parameter values of the two cells, compare the measurement parameter value determined with the interference control threshold value and divide the two cells into clusters according to the comparison result; and perform interference control according to clusters after dividing; and A base station configured to transmit the traffic load parameter value of each cell managed by the base station and the measurement parameter value between the base station and another base station to the network side device.

Because the factors of cell traffic loads are considered in the TDD cross link interference control, the cross link interference in the TDD networking is reduced and the flexibility and the efficiency of the system are further upgraded.

DETAILED DESCRIPTION OF THE EMBODIMENTS

Figure 1A:
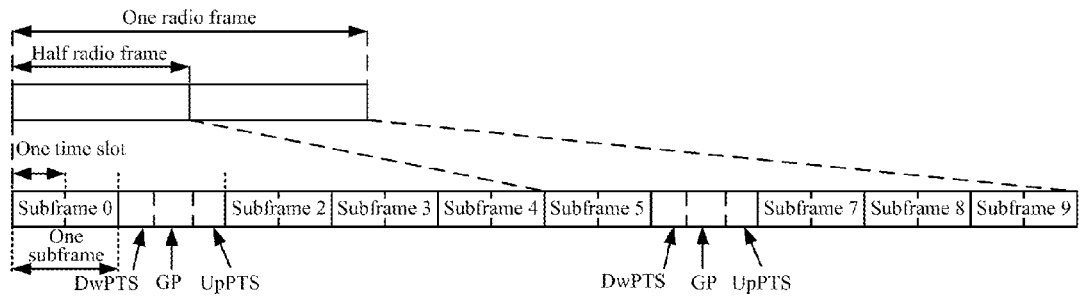
FIG. 1A is a schematic diagram of a frame structure of a TD-LTE system.
Figure 1B:
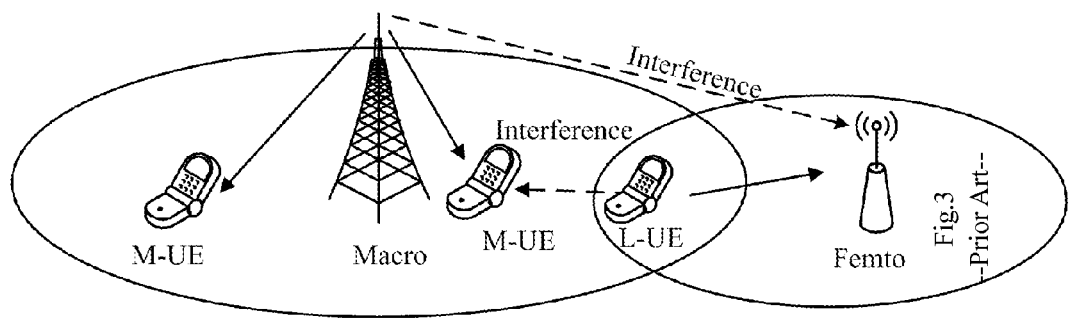
FIG. 1B is a schematic diagram of cross link interference when a same TDD carrier is used.
Figure 1C:
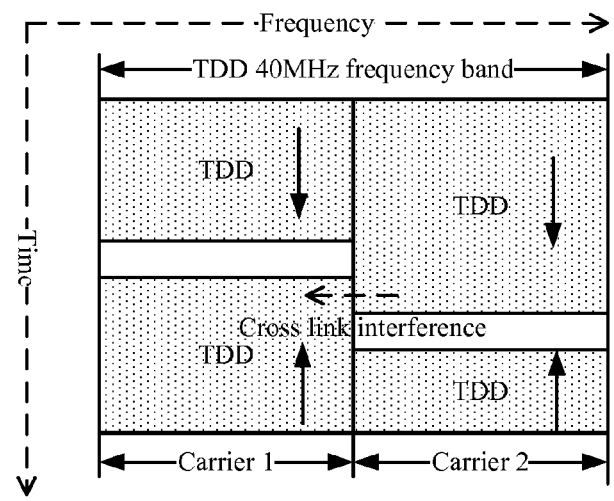
FIG. 1C is a schematic diagram of cross link interference when adjacent TDD carriers are used.

The inventors find that, in TDD networking, if different cells adopt different uplink and downlink configurations, the influence degree of cross link interference on the performances of a system is closely related with traffic loads of the cells. When the cells are in the medium loads or the relatively heavy loads, the cross link interference can significantly reduce the performances of the system; and when the cells are in the relatively light traffic loads, as the collision probability of traffics in the opposite directions of the adjacent cells is relatively low, that the probability of causing the cross link interference is also relatively low. However, the relatively light traffic loads just refer to a scene that TDD UL-DL subframe dynamic reconfiguration can obtain maximum performance gain. If relatively strict interference control is adopted uniformly, the obtainment of subframe dynamic reconfiguration performance gain will be restricted.

On this basis, in an embodiment of the invention, for adjacent two cells, a network side device determines an interference control threshold value according to traffic load parameter values of the two cells, compares the measurement parameter value determined with the interference control threshold value, divides the two cells into clusters according to the comparison result and performs interference control according to clusters after dividing. Because the factors of cell traffic loads are considered in the TDD cross link interference control, the cross link interference in the TDD networking is reduced.

In this case, a radio frame in uplink/downlink configuration involved in the embodiment of the invention includes flexible subframes, fixed downlink subframes, fixed uplink subframes and special subframes. The fixed downlink subframes refer to the subframes with the transmission direction being downlink and fixed, as well as downlink pilot time slots in the special subframe, the uplink fixed subframes refer to the subframes with the transmission direction being uplink and fixed, and the flexible subframes are the subframes with flexible transmission directions. The flexible subframes further include flexible uplink subframes and flexible downlink subframes, wherein the flexible uplink subframes are flexible subframes which are determined for uplink transmission and the flexible downlink subframes are flexible subframes which are determined for downlink transmission.

Uplink pilot time slots in the special subframes of the embodiment of the invention have the same functions as the uplink pilot time slots in the special subframes in the background and will not be described repeatedly here.

The embodiment of the invention can be applied to a TDD system (such as a TD-LTE system) and can also be applied to other systems which need to dynamically adjust uplink and downlink configurations of the subframes, for example, a TD-SCDMA system and a subsequent evolution system thereof, a WiMAX (Worldwide Interoperability for Microwave Access) system and the subsequent evolution system thereof and the like.

Figure 2A:
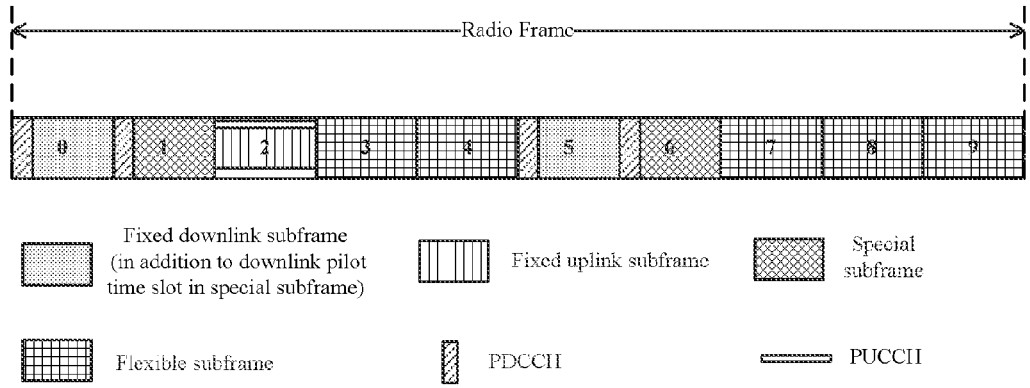
FIG. 2A is a schematic diagram of a first subframe structure of an embodiment of the invention.
Figure 2B:
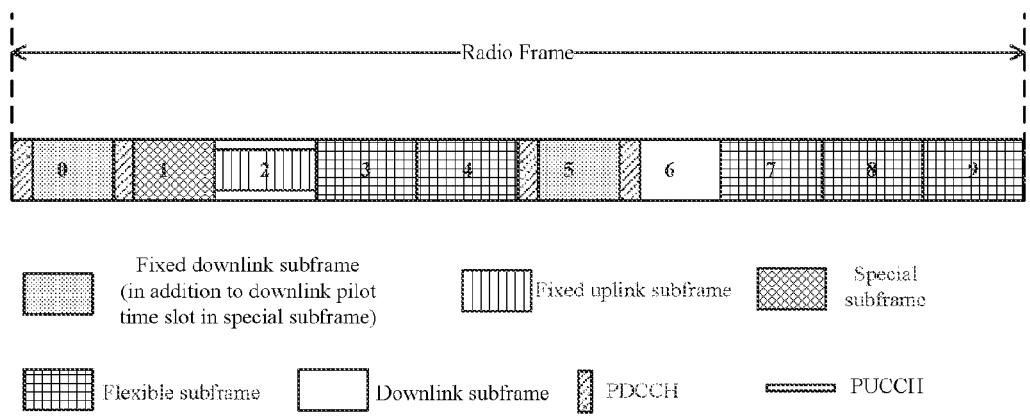
FIG. 2B is a schematic diagram of a second subframe structure of an embodiment of the invention.

In order to support the use of more downlink subframes, only one fixed uplink subframe can be set in one radio frame, namely the subframe 2 is the fixed uplink subframe, the subframe 0 and the subframe 5 are the fixed downlink subframes, the subframe 1 is the special subframe, the subframe 6 is the special subframe or the downlink subframe (the subframe with the downlink transmission direction) and the remaining subframes are the flexible subframes;

In this case, when the subframe 7 is an uplink subframe (namely the subframe 7 is the flexible subframe with the uplink transmission direction, namely flexible the uplink subframe), the subframe 6 is the special subframe, such as the structure of the radio frame as shown in FIG. 2A;

When the subframe 7 is a downlink subframe (namely the subframe 7 is the flexible subframe with the downlink transmission direction, namely the flexible downlink subframe), the subframe 6 is a downlink subframe (namely the subframe with the downlink transmission direction), such as the structure of the radio frame as shown in FIG. 2B; and under such frame structure, the maximum proportion, which can be supported, of the downlink (DL) subframes to the uplink (UL) subframes is 9:1, so that the dynamic range of self-adaptive resource in the dynamic TDD system is larger and traffic changes can be better matched.

An embodiment of the invention provides an uplink and downlink HARQ (Hybrid Automatic Repeat reQuest) temporal relation of a TDD system for the dynamic uplink and downlink subframe distribution as shown in FIG. 2A and FIG. 2B.

The measurement parameter value in the embodiment of the invention includes but not limited to one or more of the following parameter values:

Frequency resource occupancy rate, such as the proportion of PRB resources occupied by traffic transmission in bandwidth of a system in all the PRB resources;

Time resource occupancy rate, such as the proportion of subframe resources occupied by traffic transmission in the system in all the subframe resources;

Resource occupancy rate in a specific resource set, such as the resource occupancy rates of the subframes in the fixed direction and the subframes in the flexible direction (as shown in FIG. 2A), which are respectively counted; and Statistics of occupancy rates of different traffic types of resources, such as GBR (Guaranteed Bit Rate) traffic and Non-GBR traffic which are separately counted.

In this case, the measurement parameter value between base stations in the embodiment of the invention includes but not limited to one or more of the following parameter values:

A path loss value, a coupling loss value and an interference power value.

It should be noted that, as long as the parameter value can represent the isolation degree between the two base stations or signal strength which is received by a certain base station from another base station, it can be used as the measurement parameter value between the base stations in the embodiment of the invention.

The embodiment of the invention can adopt a centralized interference control mode or a distributed interference control mode. If the centralized interference control mode is adopted, the network side device in the embodiment of the invention is a central node; and if the distributed interference control mode is adopted, the network side device in the embodiment of the invention is the base station.

When a centralized interference control solution with a center is adopted, traffic load conditions of all the cells are uniformly reported to the central node through a network interface, wherein the central node can be a base station in a network (such as a Macro base station in a macro-pico networking environment or a certain pico base station in a multi-pico networking environment) or a specialized central controller. When a distributed interference control solution without the center is adopted, the traffic load conditions of respective cells are mutually notified through the network interface, wherein the network interface here can be an X2 interface, an S1 interface or other wired interfaces defined according to existing standard, or can be newly defined interfaces, or even include air interfaces through wireless transmission.

In the case, the X2 interface is an interface between the base stations and can complete user data delivery, the processing of user data and signaling and the like between the base stations. The S1 interface is a logic interface established between a radio access network node and a core network node and can be further specifically divided into a control plane interface (S1-MME) and a user plane interface (S1-U). The S1-MME is the logic interface established between the radio access network node and MME and used for transmitting control plane signaling (as for the specific contents of the signaling, please refer to 3GPP TS36.413). The S1-U is the logic interface established between the radio access network node and SGW and used for transmitting user plane data (as for formats of user plane data packets, please refer to 3GPP TS29.281).

The embodiments of the invention will be further described in detail in combination with the accompanying drawings of the description.

Figure 3:
FIG. 3 is a schematic diagram of structure of a system for performing interference control of an embodiment of the invention.

As shown in FIG. 3, a system for performing interference control of an embodiment of the invention includes a network side device 10 and a base station 20.

The network side device 10 is configured to determine a traffic load parameter value of each cell and a measurement parameter value between base stations which serve for any two cells; for the two cells, determine an interference control threshold value according to the traffic load parameter values of the two cells, and compare the measurement parameter value determined with the interference control threshold value and divides the two cells into clusters according to the comparison result; and perform interference control according to clusters after dividing; and The base station 20 is configured to transmit the traffic load parameter value of each cell managed by the base station and the measurement parameter value between the base station and another base station to the network side device.

Preferably, the network side device 10 determines the load grade according to the traffic load parameter values of the two cells; and searches for the interference control threshold value corresponding to the load grade determined according to the corresponding relation between the load grade and the interference control threshold value and takes the interference control threshold value searched out as the interference control threshold value.

In the implementation, the corresponding relation between the load grade and the interference control threshold value can be set as needed. The traffic load conditions can be divided into more than one grade and the corresponding interference control threshold value is set according to each traffic load condition grade, thereby preventing the uniform setting of the interference control threshold value from limiting the flexibility of the network.

Assumed that, there are two interference control threshold values, namely P1 and P2, P1<P2, the grade I corresponds to the P1 threshold, and the grade II corresponds to the P2 threshold, when the cell A and the cell B are in the situation of relatively light traffic loads (for example, the traffic load parameter values of both the cell A and the cell B are smaller than the threshold), the load grade is considered to be the grade I and clustering judgment is performed based on the P1 threshold; and when one of the cell A and the cell B is in the situation of relatively heavy traffic load (for example, the traffic load parameter value of the cell A or the cell B is smaller than the threshold), the load grade can be considered to be the grade II and the clustering judgment is performed based on the P2 threshold.

Preferably, if the measurement parameter value between the base stations is the path loss value or the coupling loss value:

When the measurement parameter value between the base stations which serves for the two cells is smaller than the determined interference control threshold value, the network side device 10 divides the two cells into a same cluster; and when the measurement parameter value between the base stations which serves for the two cells is no smaller than the determined interference control threshold value, the network side device 10 divides the two cells into different clusters.

For example, when the cell A and the cell B are in the situation of relatively light traffic loads, the clustering judgment is performed based on the P1 threshold, that is, when P_AB<P1, the cells A and B are divided into the same cluster; otherwise, the cells A and B are divided into the different clusters;

When one of the cell A and the cell B is in the situation of relatively heavy traffic load, the clustering judgment is performed based on the P2 threshold, that is, when P_AB<P2, the cells A and B are divided into the same cluster; otherwise, the cells A and B are divided into different clusters.

Preferably, if the measurement parameter value between the base stations is the interference power value:

When the measurement parameter value between the base stations which serve for the two cells is larger than the interference control threshold value determined, the network side device 10 divides the two cells into a same cluster; and When the measurement parameter value between the base stations which serve for the two cells is no larger than the interference control threshold value determined, the network side device 10 divides the two cells into the different clusters.

Preferably, after the cluster dividing and before performing the interference control, the network side device 10 can also perform merging on the clusters after dividing, wherein any two clusters after merging do not contain a same cell.

For example, if the cluster 1 contains the cells A and B, the cluster 2 contains the cells B and C and the cluster 3 contains the cell D, then the cluster 1 and the cluster 2 are merged into one cluster containing the cells A, B and C, and the cluster 3 is another cluster.

For example, if there are three clusters, the cluster 1 contains the cells A and B, the cluster 2 contains the cells B and C and the cluster 3 contains the cells C and D, then the cluster 1 and the cluster 2 are merged into one cluster 4 containing the cells A, B and C. As the cluster 3 contains the cell C, the cluster 3 and the cluster 4 can also be merged into one cluster containing the cells A, B, C and D.

Preferably, the network side device 10 uses same uplink and downlink configurations for the cells in the same cluster; and uses same or different uplink and downlink configurations for the cells in the different clusters.

In the implementation, if the embodiment of the invention adopts the centralized interference control mode, the network side device 10 is the central node; and if the embodiment of the invention adopts the distributed interference control mode, the network side device 10 is the base station.

Preferably, when the centralized interference control mode with a central node is adopted, the measurement parameter values are reported by the base stations to the central node; and the traffic load parameter values of the TDD cells are reported by the base stations to the central node.

Specifically, for one base station, the network side device 10 receives the traffic load parameter value of each cell managed by the base station, which is determined by the base station, and the measurement parameter value between the base station and another base station, which is determined by the base station.

When the distributed interference control mode without the central node is adopted, the measurement parameter values are interacted between the base stations; and the traffic load parameter values of the cells are interacted between the base stations.

Specifically, the network side device 10 determines the traffic load parameter value of each cell managed by the network side device 10 and the measurement parameter value between the network side device 10 and another network side device and receives the traffic load parameter value of each cell managed by another base station, which is determined by the another base station, and the measurement parameter value between the base stations, which is determined by the another base station.

For example, the base station A can receive the traffic load parameter value of the cell managed by the base station B and the measurement parameter value between the base station B and another base station, which is determined by the base station B.

If the distributed interference control mode without the central node is adopted, the network side device 10 also needs to transmit the traffic load parameter value of the cell managed by the network side device 10 and the measurement parameter value between the network side device 10 and another network side device to another base station.

Figure 4:
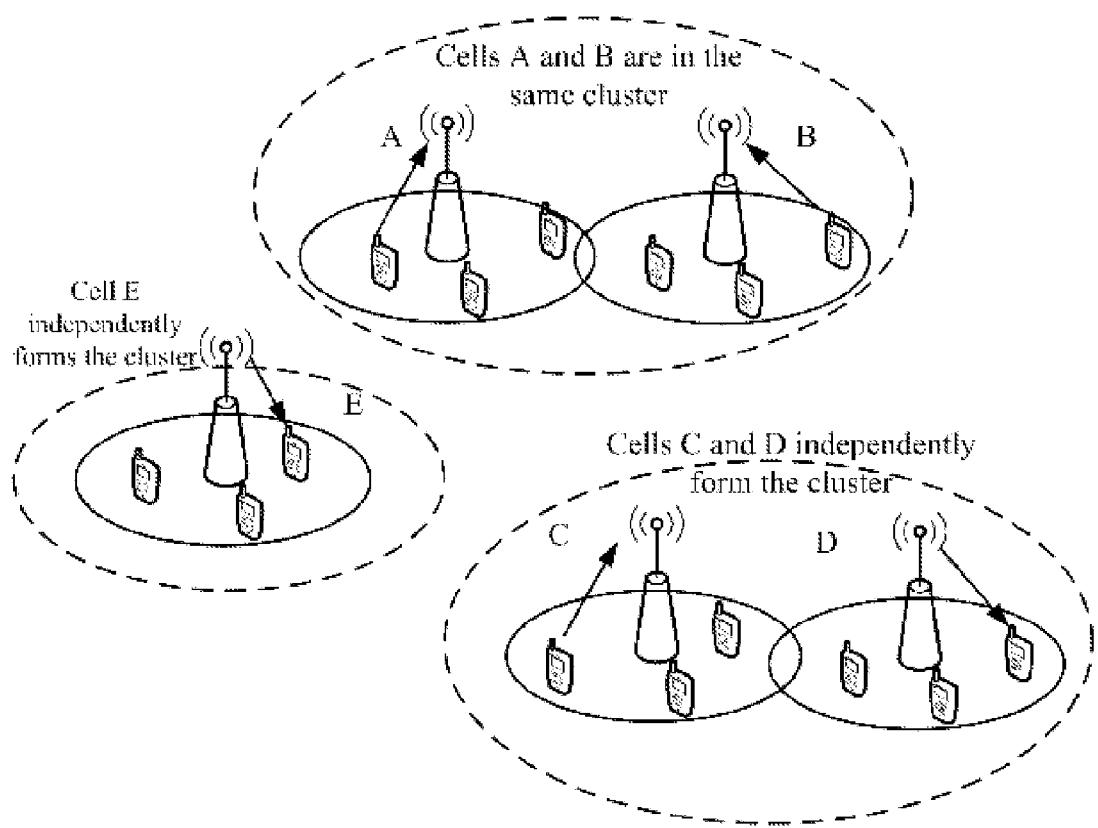
FIG. 4 is a schematic diagram of an application scene of an embodiment of the invention.

Taking FIG. 4 as an example, the path loss between the cell A and the cell B is XdB, the path loss between the cell C and the cell D is YdB and X and Y are close. If the cell A and the cell B are in the relatively heavy loads, then the threshold value P1 is used; and if the cell C and the cell D are in the relatively light loads, then the threshold value P2 is used.

According to the solution of the embodiment of the invention, as X<P1, the cell A and the cell B are divided into the same cluster and the same uplink and downlink configurations are used; and as Y≥P2, the cells C and D respectively independently form the clusters and the different uplink and downlink configurations can be used, so that the flexibility in resource scheduling in the traffic range of the cell C and the cell D is further upgraded.

As the cell E is relatively far relative to the cells A, B, C and D, the path loss between the cell E and each cell is no smaller than P1 and P2 and the cell E can independently form the cluster.

Figure 5:
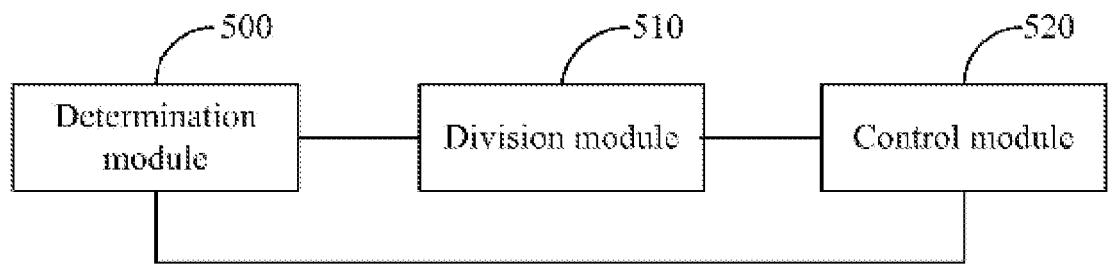
FIG. 5 is a schematic diagram of a structure of a network side device in the system for performing interference control of an embodiment of the invention.

As shown in FIG. 5, the network side device in the system for performing interference control of the embodiment of the invention includes: a determination module 500, a division module 510 and a control module 520.

The determination module 500 is configured to determine the traffic load parameter value of each cell and the measurement parameter value between the base stations which serve for any two cells belong;

The division module 510 is configured to, for the two cells, determine the interference control threshold value according to the traffic load parameter values of the two cells, compare the measurement parameter value determined with the interference control threshold value and divide the two cells into clusters according to the comparison result; and The control module 520 is configured to perform interference control according to the clusters after dividing.

Preferably, the division module 510 determines the load grade according to the traffic load parameter values of the two cells; and searches for the interference control threshold value corresponding to the load grade determined according to the corresponding relation between the load grade and the interference control threshold value and takes the interference control threshold value searched out as the interference control threshold value.

Preferably, if the measurement parameter value between the base stations is the path loss value or the coupling loss value;

When the measurement parameter value between the base stations which serve for the two cells is smaller than the interference control threshold value determined, the division module 510 divides the two cells into a same cluster; and when the measurement parameter value between the base stations which serve for the two cells is no smaller than the interference control threshold value determined, the division module 510 divides the two cells into the different clusters.

Preferably, if the measurement parameter value between the base stations is the interference power value;

When the measurement parameter value between the base stations which serves for the two cells is larger than the interference control threshold value determined, the division module 510 divides the two cells into the same cluster; and when the measurement parameter value between the base stations which serve for the two cells is no larger than the interference control threshold value determined, the division module 510 divides the two cells into the different clusters.

Preferably, after cluster dividing, the division module 510 performs merging on the clusters after dividing;

In this case, any two clusters after merging do not contain a same cell.

Preferably, the control module 520 uses same uplink and downlink configurations for the cells in the same cluster; and uses same or different uplink and downlink configurations for the cells in the different clusters.

Preferably, if the centralized interference control mode is adopted, the network side device is the central node; and if the distributed interference control mode is adopted, the network side device is the base station.

Preferably, the network side device is the central node;

For one base station, the determination module 500 receives the traffic load parameter value of each cell managed by the base station, which is determined by the base station, and the measurement parameter value between the base station and another base station, which is determined by the base station.

Preferably, the network side device is the base station;

The determination module 500 determines the traffic load parameter value of each cell managed by the network side device and the measurement parameter value between the network side device and another network side device and receives the traffic load parameter value of each cell managed by another base station, which is determined by the another base station, and the measurement parameter value between the base stations, which is determined by the another base station.

If the distributed interference control mode without the center is adopted, the determination module 500 also needs to transmit the traffic load parameter value of the cell managed by the network side device and the measurement parameter value between the network side device and another network side device to another base station.

Based on the same inventive concept, an embodiment of the invention further provides a method for performing interference control. As the principle of the method for solving the problems is similar to that of the system for performing interference control of the embodiment of the invention, the implementation of the method can refer to the implementation of the system and will not be repeatedly discussed here.

Figure 6:
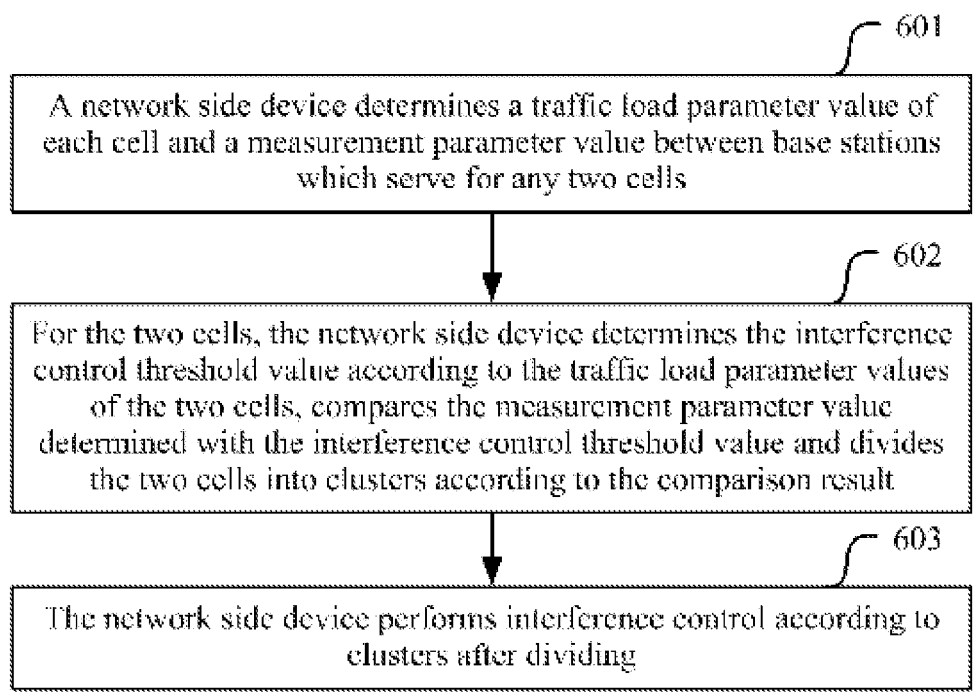
FIG. 6 is a flow diagram of a method for performing interference control of an embodiment of the invention.

As shown in FIG. 6, the method for performing interference control of the embodiment of the invention includes the following operations:

Operation 601, a network side device determines a traffic load parameter value of each cell and a measurement parameter value between base stations which serve for any two cells;

Operation 602, for the two cells, the network side device determines the interference control threshold value according to the traffic load parameter values of the two cells, compares the measurement parameter value determined with the interference control threshold value and divides the two cells into clusters according to the comparison result; and Operation 603, the network side device performs interference control according to clusters after dividing.

Preferably, in operation 602, the network side device determines a load grade according to the traffic load parameter values of the two cells; and searches for the interference control threshold value corresponding to the load grade determined according to the corresponding relation between the load grade and the interference control threshold value and takes the interference control threshold value searched out as the interference control threshold value.

In the implementation, the corresponding relation between the load grade and the interference control threshold value can be set as needed. The traffic load conditions can be divided into more than one grade and the corresponding interference control threshold value is set according to each traffic load condition grade, thereby preventing the uniform setting of the interference control threshold value from limiting the flexibility of the network.

Preferably, if the measurement parameter value between the base stations is the path loss value or the coupling loss value:

When the measurement parameter value between the base stations which serve for the two cells is smaller than the interference control threshold value determined, the network side device divides the two cells into a same cluster; and when the measurement parameter value between the base stations which serve for the two cells is no smaller than the interference control threshold value determined, the network side device divides the two cells into different clusters.

Preferably, if the measurement parameter value between the base stations is the interference power value:

When the measurement parameter value between the base stations which serve for the two cells is larger than the interference control threshold value determined, the network side device divides the two cells into a same cluster; and When the measurement parameter value between the base stations which serve for the two cells is no larger than the interference control threshold value determined, the network side device divides the two cells into the different clusters.

Preferably, after the cluster dividing and before performing the interference control, the network side device can also perform merging on the clusters after dividing, wherein any two clusters after merging do not contain a same cell.

Preferably, in operation 603, the network side device uses same uplink and downlink configurations for the cells in the same cluster; and uses same or different uplink and downlink configurations for the cells in the different clusters.

In the implementation, if the embodiment of the invention adopts the centralized interference control mode, the network side device is the central node; and if the embodiment of the invention adopts the distributed interference control mode, the network side device is the base station.

Preferably, when the centralized interference control way with a center is adopted, the measurement parameter values are reported by the base stations to the central node; and the traffic load parameter values of the TDD cells are reported by the base stations to the central node.

Specifically, in operation 601, for one base station, the network side device receives the traffic load parameter value of each cell managed by the base station, which is determined by the base station, and the measurement parameter value between the base station and another base station, which is determined by the base station.

When the distributed interference control way without the center is adopted, the measurement parameter value is interacted between the base stations; and the traffic load parameter values of the cells are interacted between the base stations.

Specifically, in operation 601, the network side device determines the traffic load parameter value of each cell managed by the network side device and the measurement parameter value between the network side device and another network side device and receives the traffic load parameter value of each cell managed by another base station, which is determined by the another base station, and the measurement parameter value between the base stations, which is determined by the another base station.

Those skilled in the art should understand that the embodiments of the invention can provide the method, the system or a computer program product. Therefore, the invention can adopt the forms of complete hardware embodiments, complete software embodiments or embodiments combining software and hardware. Furthermore, the invention can adopt the form of the computer program product which is implemented on one or more computer usable storage media (including but not limited to magnetic disk memories, CD-ROMs, optical memories and the like) containing computer usable program codes.

The invention is described by referring to a flow diagram and/or a block diagram of the method, the device (system) and the computer program product according to the embodiments of the invention. It should be understood that each process and/or block in the flow diagram and/or the block diagram and the combination of the processes and/or the blocks in the flow diagram and/or the block diagram can be implemented by computer program instructions. These computer program instructions can be provided to a general-purpose computer, a special-purpose computer, an embedded processor or a processor of another programmable data processing device to produce a machine, thereby producing a device for implementing the functions designated in one or multiple processes in the flow diagram and/or one or multiple blocks in the block diagram through the instructions executed by the computer or the processor of the another programmable data processing device.

These computer program instructions can be stored in a computer readable memory capable of guiding the computer or the another programmable data processing device to work in a specific way, thereby enabling the instructions which are stored in the computer readable memory to produce a manufactured product including an instruction device, wherein the instruction device implements the functions designated in one or multiple processes in the flow diagram and/or one or multiple blocks in the block diagram.

These computer program instructions can also be loaded onto the computer or the another programmable data processing device, so that the computer or the another programmable device can execute a series of operation operations to produce the treatment implemented by the computer, thereby enabling the instructions executed on the computer or the another programmable device to provide the operation of implementing the functions designated in one or multiple processes in the flow diagram and/or one or multiple blocks in the block diagram.

Although the preferred embodiments of the invention have been described, once those skilled in the art know the basic inventive concepts, they can make alternative changes and modifications to these embodiments. Thus, the appended claims intend to be interpreted as including the preferred embodiments and all the changes and modifications within the scope of the invention.

Obviously, those skilled in the art can make various modifications and variations to the invention without deviating from the spirit and scope of the invention. Thus, if the modifications and variations of the invention still fall within the scope of the claims of the invention and the equivalent technologies thereof, the invention also intend to include these modifications and variations.

The invention claimed is:

1. A method for performing interference control, comprising:
    determining, by a network side device, a traffic load parameter value of each cell and a measurement parameter value between base stations which serve for any two cells, the measurement parameter value between the base stations is one or more of the following parameter values: a path loss value, a coupling loss value or an interference power value;
    for the two cells, determining, by the network side device, an interference control threshold value according to the traffic load parameter values of the two cells, comparing the measurement parameter value determined with the interference control threshold value and dividing the two cells into clusters according to the comparison result; and
    performing, by the network side device, interference control according to clusters after dividing;
    wherein the performing, by the network side device, interference control according to the clusters after dividing comprises:
    the network side device using the same uplink and downlink configuration for the cells in the same cluster, wherein the uplink and downlink configuration is an allocation pattern of uplink and downlink sub-frames in a radio frame; and
    the network side device using same or different uplink and downlink configurations for the cells in the different clusters.

2. The method according to claim 1, wherein determining, by the network side device, the interference control threshold value comprises:
    determining, by the network side device, a load grade according to the traffic load parameter values of the two cells; and
    searching for, by the network side device, an interference control threshold value corresponding to the load grade determined according to a corresponding relation between the load grade and the interference control threshold value and taking the interference control threshold value searched out as the interference control threshold value.

3. The method according to claim 1, wherein after the network side device divides the two cells into clusters and before the network side device performs interference control, the method further comprises:
    performing, by the network side device, merging on the clusters after dividing;
    wherein any two clusters after merging do not contain a same cell.

4. The method according to claim 1, wherein if a centralized interference control mode is adopted, the network side device is a central node; and
    if a distributed interference control mode is adopted, the network side device is a base station.

5. The method according to claim 4, wherein the network side device is the central node; and determining, by the network side device, the traffic load parameter value of each cell and the measurement parameter value between the base stations which serve for any two cells comprises:
for one base station, the network side device receives the traffic load parameter value of each cell managed by the base station, which is determined by the base station, and the measurement parameter value between the base station and another base station, which is determined by the base station.

6. The method according to claim 4, wherein the network side device is the base station;
determining, by the network side device, the traffic load parameter value of each cell and the measurement parameter value between the base stations which serve for any two cells comprises:
determining, by the network side device, the traffic load parameter value of each cell managed by the network side device and the measurement parameter value between the network side device and another network side device, and receiving the traffic load parameter value of each cell managed by another base station, which is determined by the another base station, and the measurement parameter value between the base stations, which is determined by the another base station.

7. The method according to claim 1, wherein the traffic load parameter value of each cell comprises one or more of the following parameter values:
frequency resource occupancy rate, time resource occupancy rate, resource occupancy rate in a specific resource set or statistics of occupancy rates of different traffic types of resources.

8. The method according to claim 1, wherein when the measurement parameter value between the base stations is the path loss value or the coupling loss value; then
the dividing, by the network side device, the two cells into clusters comprises:
when the measurement parameter value between the base stations which serve for the two cells is smaller than the interference control threshold value determined, dividing, by the network side device, the two cells into a same cluster; and
when the measurement parameter value between the base stations which serve for the two cells is no smaller than the interference control threshold value determined, dividing, by the network side device, the two cells into different clusters.

9. The method according to claim 1, wherein when the measurement parameter value between the base stations is the interference power value, then
the dividing, by the network side device, the two cells into clusters comprises:
dividing, by the network side device, the two cells into a same cluster if the measurement parameter value between the base stations which serve for the two cells is larger than the interference control threshold value determined; and dividing, by the network side device, the two cells into different clusters if the measurement parameter value between the base stations which serve for the two cells is no larger than the interference control threshold value determined.

10. A network side device for performing interference control, comprising:
a determination module configured to determine a traffic load parameter value of each cell and a measurement parameter value between base stations which serve for any two cells, the measurement parameter value between the base stations is one or more of the following parameter values: a path loss value, a coupling loss value or an interference power value;
a division module configured to, for the two cells, determine an interference control threshold value according to the traffic load parameter values of the two cells, compare the measurement parameter value determined with the interference control threshold value and divide the two cells into clusters according to the comparison result; and
a control module configured to perform interference control according to clusters after dividing;
wherein the control module is configured to: use the same uplink and downlink configuration for the cells in the same cluster; and use same or different uplink and downlink configurations for the cells in the different clusters, and wherein the uplink and downlink configuration is an allocation pattern of uplink and downlink sub-frames in a radio frame.

11. The network side device according to claim 10, wherein the division module is specifically configured to:
determine a load grade according to the traffic load parameter values of the two cells; and search for an interference control threshold value corresponding to the load grade determined according to a corresponding relation between the load grade and the interference control threshold value and take the interference control threshold value searched out as the interference control threshold value.

12. The network side device according to claim 10, wherein the division module is further configured to:
perform merging on the clusters after dividing,
wherein any two clusters after merging do not contain a same cell.

13. The network side device according to claim 10, wherein if a centralized interference control mode is adopted, the network side device is a central node; and
if a distributed interference control mode is adopted, the network side device is a base station;
when the network side device is the central node; then the determination module is specifically configured to:
for one base station, receive the traffic load parameter value of each cell managed by the base station, which is determined by the base station, and the measurement parameter value between the base station and another base station, which is determined by the base station;
when the network side device is the base station; then the determination module is specifically configured to:
determine the traffic load parameter value of each cell managed by the network side device and the measurement parameter value between the network side device and another network side device, and receive the traffic load parameter value of each cell managed by another base station, which is determined by the another base station, and the measurement parameter value between the base stations, which is determined by the another base station.

14. The network side device according claim 10, wherein the traffic load parameter value of each cell comprises one or more of the following parameter values:
frequency resource occupancy rate, time resource occupancy rate, resource occupancy rate in a specific resource set or statistics of occupancy rates of different traffic types of resources.

15. The network side device according to claim 10, wherein when the measurement parameter value between the base stations is the path loss value or the coupling loss value;

and the division module is specifically configured to:

when the measurement parameter value between the base stations which serve for the two cells is smaller than the interference control threshold value determined, divide the two cells into a same cluster; and when the measurement parameter value between the base stations which serve for the two cells is no smaller than the interference control threshold value determined, divide the two cells into different clusters.

16. The network side device according to claim 10, wherein when the measurement parameter value between the base stations is the interference power value;

and the division module is specifically configured to:

when the measurement parameter value between the base stations which serve for the two cells is larger than the interference control threshold value determined, divide the two cells into a same cluster; and when the measurement parameter value between the base stations which serve for the two cells is no larger than the interference control threshold value determined, divide the two cells into different clusters.

* * * * *